(12) United States Patent
Huang et al.

(10) Patent No.: US 9,183,430 B2
(45) Date of Patent: Nov. 10, 2015

(54) PORTABLE ELECTRONIC APPARATUS AND INTERACTIVE HUMAN FACE LOGIN METHOD

(71) Applicant: Quanta Computer Inc., Tao Yuan Shien (TW)

(72) Inventors: Po-Chi Huang, Taichung (TW); Chih-Chi Cheng, New Taipei (TW)

(73) Assignee: QUANTA COMPUTER INC., Tao Yuan Shien (TW)

( * ) Notice: Subject to any disclaimer, the term of this patent is extended or adjusted under 35 U.S.C. 154(b) by 155 days.

(21) Appl. No.: 14/045,459

(22) Filed: Oct. 3, 2013

(65) Prior Publication Data

US 2015/0023569 A1     Jan. 22, 2015

(30) Foreign Application Priority Data

Jul. 19, 2013   (TW) .............................. 102125983 A

(51) Int. Cl.
*G06K 9/00*            (2006.01)
(52) U.S. Cl.
CPC .................................. *G06K 9/00315* (2013.01)
(58) Field of Classification Search
USPC ......... 382/115, 117, 118, 209, 219, 224, 278; 340/5.81, 5.83
See application file for complete search history.

(56) References Cited

U.S. PATENT DOCUMENTS

| 6,690,815 | B2 * | 2/2004 | Mihara | G06K 9/00201 382/118 |
| 6,964,023 | B2 * | 11/2005 | Maes | G06F 3/0481 704/E15.041 |
| 7,469,060 | B2 * | 12/2008 | Bazakos | G06K 9/00255 382/173 |
| 7,769,705 | B1 * | 8/2010 | Luechtefeld | 706/47 |
| 7,783,629 | B2 * | 8/2010 | Li et al. | 707/723 |
| 8,069,131 | B1 * | 11/2011 | Luechtefeld et al. | 706/47 |
| 8,390,648 | B2 * | 3/2013 | Ptucha et al. | 345/638 |
| 8,634,596 | B2 * | 1/2014 | Bedros | G06K 9/00201 382/115 |
| 8,791,914 | B2 * | 7/2014 | Zhao | 345/173 |
| 8,898,098 | B1 * | 11/2014 | Luechtefeld | 706/47 |

FOREIGN PATENT DOCUMENTS

TW        201118755 A     6/2011

OTHER PUBLICATIONS

Taiwanese Office Action dated Jan. 7, 2015.

* cited by examiner

*Primary Examiner* — Yosef Kassa
(74) *Attorney, Agent, or Firm* — Rabin & Berdo, P.C.

(57) ABSTRACT

A portable electronic apparatus and an interactive human face login method are disclosed. The portable electronic apparatus comprises a face database, a user interface, an image capturing device, and a recognition circuit. The face database stores a plurality of facial expression feature information. The user interface randomly generates a plurality of facial expression indications used for guiding a user to sequentially show a plurality of facial expressions. The image capturing device captures the facial expressions to output a plurality of facial expression images. The recognition circuit receives a login request and determines whether the facial expressions are consistent with the facial expression indications according to the facial expression feature information and the facial expression images. The login request is allowed if the facial expressions are consistent with the facial expression indications.

18 Claims, 7 Drawing Sheets

PORTABLE ELECTRONIC APPARATUS AND INTERACTIVE HUMAN FACE LOGIN METHOD

This application claims the benefit of Taiwan application Serial No. 102125983, filed Jul. 19, 2013, the subject matter of which is incorporated herein by reference.

BACKGROUND OF THE INVENTION

1. Field of the Invention

The invention relates in general to an electronic apparatus, and more particularly to a portable electronic apparatus and an interactive human face login method.

2. Description of the Related Art

As smart computing devices have gained a great popularity, the process of recognizing personal identity to login an electronic apparatus or an application program has become a daily routine to modern people. The electronic apparatus is such as a notebook, a mobile phone, a tablet PC or a smart watch, and the application program is such as E-mail, chat software or a community platform. Both the electronic apparatus and the application programs require identity recognition in order to retrieve personal information to executing relevant applications.

Conventional method of identity recognition uses a set of personal passwords inputted through an input device such as keyboard, mouse, or touch screen. The conventional method secures personal privacy, but is an unpleasant experience to the user who has to bother to input their passwords for the purpose of identity recognition. Particular, when most mobile computing devices have replaced physical keyboard with virtual keyboard of touch screen, the input of passwords is made more difficult and inconvenient.

SUMMARY OF THE INVENTION

The invention is directed to a portable electronic apparatus and an interactive human face login method.

According to one embodiment of the present invention, a portable electronic apparatus is disclosed. The portable electronic apparatus comprises a face database, a user interface, an image capturing device, and a recognition circuit. The face database stores a plurality of facial expression feature information. The user interface randomly generates a plurality of facial expression indications used for guiding a user to sequentially show a plurality of facial expressions. The image capturing device captures the facial expressions to output a plurality of facial expression images. The recognition circuit receives a login request and determines whether the facial expressions are consistent with the facial expression indications according to the facial expression feature information and the facial expression images. The login request is allowed if the facial expressions are consistent with the facial expression indications.

According to another embodiment of the present invention, an interactive human face login method is disclosed. The interactive human face login method comprises following steps. Firstly, a login request is received. Next, a plurality of facial expression indications are randomly generated and used for guiding a user to sequentially show a plurality of facial expressions. Then, the facial expressions are captured to output a plurality of facial expression images. Then, whether the facial expressions are consistent with the facial expression indications is determined according to the facial expression feature information and the facial expression images of a face database. The login request is allowed if the facial expressions are consistent with the facial expression indications.

The above and other aspects of the invention will become better understood with regard to the following detailed description of the preferred but non-limiting embodiment(s). The following description is made with reference to the accompanying drawings.

DETAILED DESCRIPTION OF THE INVENTION

First Embodiment

Figure 1:
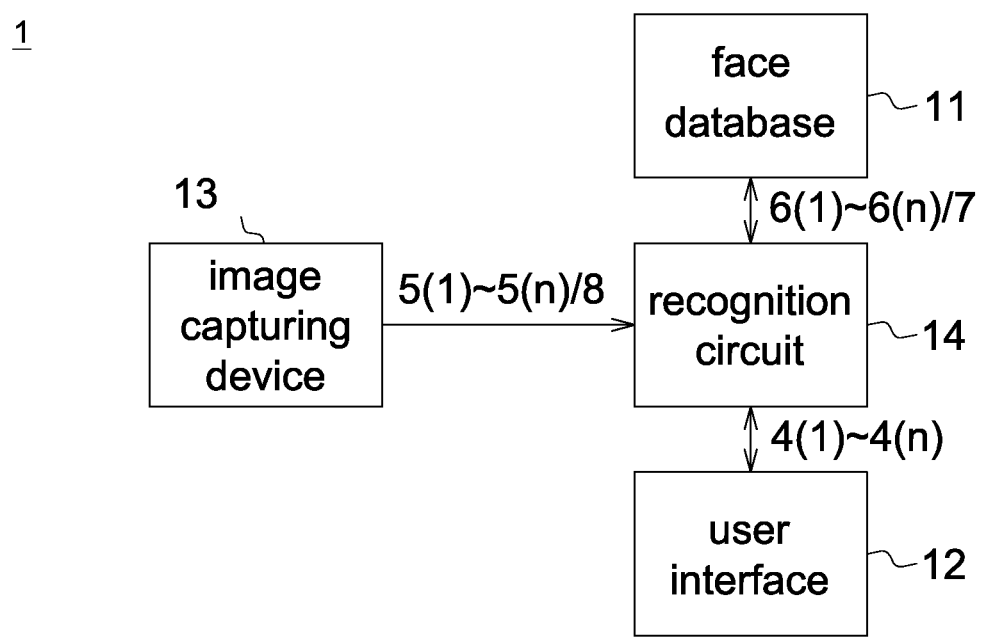
FIG. 1 is a schematic diagram of a portable electronic apparatus according to a first embodiment.

Referring to FIG. 1, a schematic diagram of a portable electronic apparatus according to a first embodiment is shown. The portable electronic apparatus 1 such as a notebook, a mobile phone, a tablet PC or a smart watch. The portable electronic apparatus 1 comprises a face database 11, a user interface 12, an image capturing device 13 and a recognition circuit 14. The image capturing device 13 is such as a camera, and the recognition circuit 14 is such as a processor. The face database 11 stores a plurality of facial expression feature information 6(1)~6(n) and a facial expression feature information 7, wherein n is a positive integer greater than 1. The user interface 12 randomly generates a plurality of facial expression indications 4(1)~4(n), wherein n is a positive integer greater than 1. The facial expression indications 4(1)~4(n), which can be different from each other, are used for guiding a user to sequentially show a plurality of different facial expressions. The user interface 12 is such as a screen or a speaker. If the user interface 12 is a screen, then the user can be informed of the facial expression indications 4(1)~4(n) via images. If the user interface 12 is a speaker, then the user can be informed of the facial expression indications 4(1)~4(n) via the sound.

The facial expression indications 4(1)~4(n) are such as smiling, blinking the left eye or the right eye, or lifting an eyebrow. Each of the facial expression indications 4(1)~4(n) such as comprises a textual description or a graphic description. Or, each of the facial expression indications 4(1)~4(n) comprises a textual description and a graphic description. The image capturing device 13 captures a plurality of facial expressions of the user to output a plurality of facial expression images 5(1)~5(n), wherein n is a positive integer greater than 1. The recognition circuit 14 receives a login request, and determines whether a plurality of facial expressions are consistent with the facial expression indications 4(1)~4(n) according to the facial expression feature information 6(1)~6(n) and the facial expression images 5(1)~5(n). The login request is allowed when a plurality of facial expressions are consistent with the facial expression indications 4(1)~4(n). The login request is such as a request to login the portable electronic apparatus 1 or an application program executed by the portable electronic apparatus 1 such as E-mail, chat software or a community platform. The user needs to randomly generate the facial expression indications 4(1)~4(n) according to the user interface 12 and accordingly shows the facial expressions one by one, hence effectively avoiding people maliciously using photos or images to crack the facial expression recognition mechanism. By doing so, system security is greatly enhanced, and personal information will not be leaked.

Figure 2:
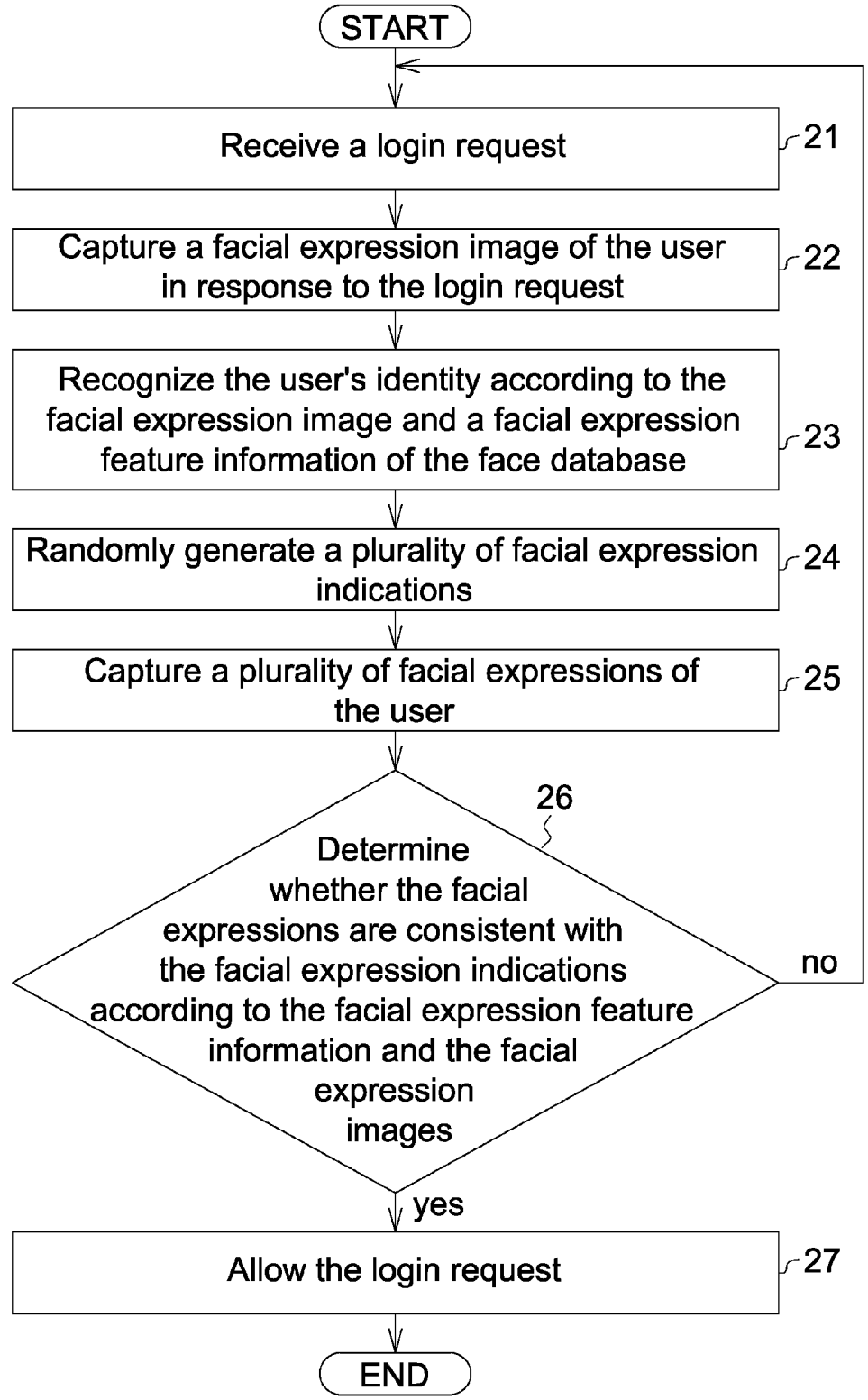
FIG. 2 is a flowchart of an interactive human face login method according to the first embodiment.

Referring to FIG. 1 and FIG. 2. FIG. 2 is a flowchart of an interactive human face login method according to the first embodiment. The interactive human face login method is applied to the portable electronic apparatus 1, and comprises following steps. Firstly, the method begins at step 21, the recognition circuit 14 receives a login request. Next, the method proceeds to step 22, the image capturing device 13 captures a facial expression image 8 of the user in response to the login request. Then, the method proceeds to step 23, the recognition circuit 14 recognizes user's identity according to the facial expression image 8 and the facial expression feature information 7 of the face database 11.

Then, the method proceeds to step 24, the user interface 12 randomly generates a plurality of facial expression indications 4(1)~4(n) used for guiding a user to sequentially show a plurality of different facial expressions. Then, the method proceeds to step 25, a plurality of facial expressions of the user are captured to output a plurality of facial expression images 5(1)~5(n). Then, the method proceeds to step 26, the recognition circuit 14 determines whether the facial expressions are consistent with the facial expression indications 4(1)~4(n) according to the facial expression feature information 6(1)~6(n) and the facial expression images 5(1)~5(n). If the facial expressions are consistent with the facial expression indications 4(1)~4(n), then the method proceeds to step 27. In step 27, the login request is allowed.

Figure 3:
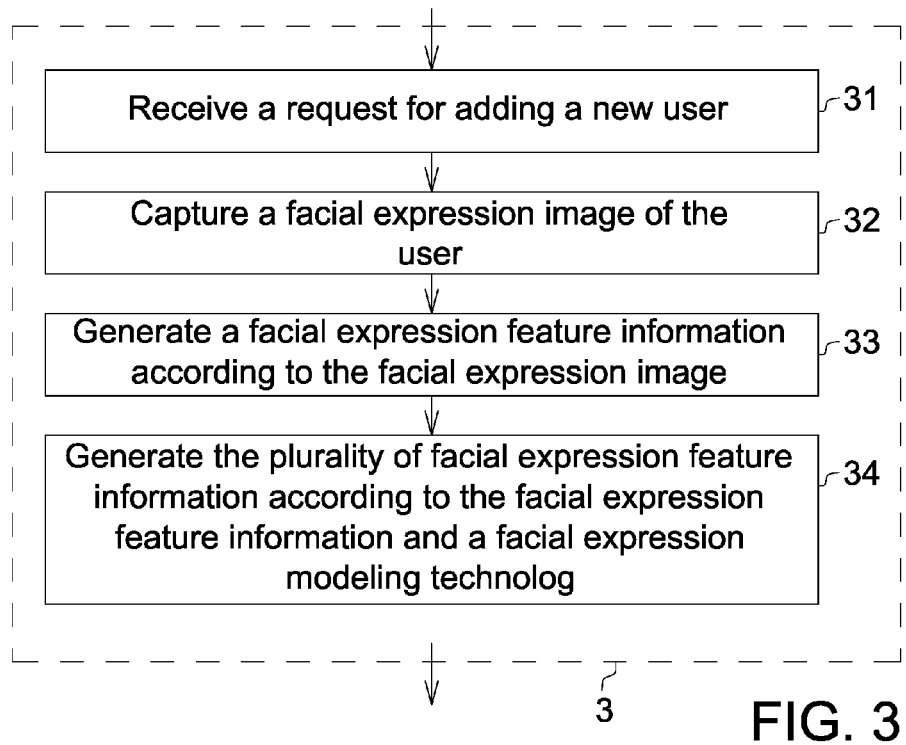
FIG. 3 is a flowchart of creating a face database according to the first embodiment.

Referring to FIG. 1, FIG. 2 and FIG. 3. FIG. 3 is a flowchart of creating a face database according to the first embodiment. The interactive human face login method may further comprises step 20. In step 20, a face database 11 is created. Step 20 comprises following sub-steps. In sub-step 201, the recognition circuit 14 receives a request for adding a new user. Then, the method proceeds to sub-step 202, the image capturing device 13 captures a facial expression image 8 of the user. In sub-step 203, the recognition circuit 14 generates a facial expression feature information 7 according to the facial expression image 8. Then, the method proceeds to sub-step 204, the recognition circuit 14 generates facial expression feature information 6(1)~6(n) according to the facial expression feature information 7 and the facial expression modeling technology.

Figure 4:
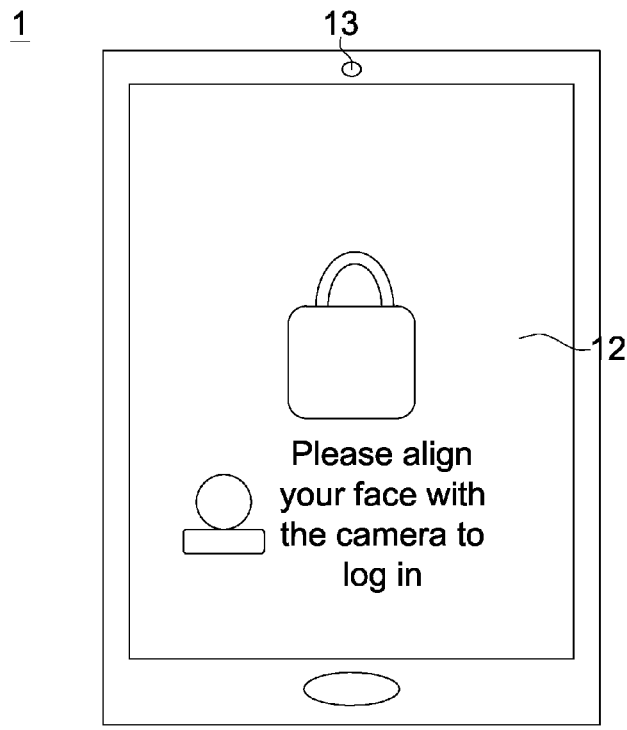
FIG. 4 is a schematic diagram of a portable electronic apparatus being in a locked state.
Figure 5:
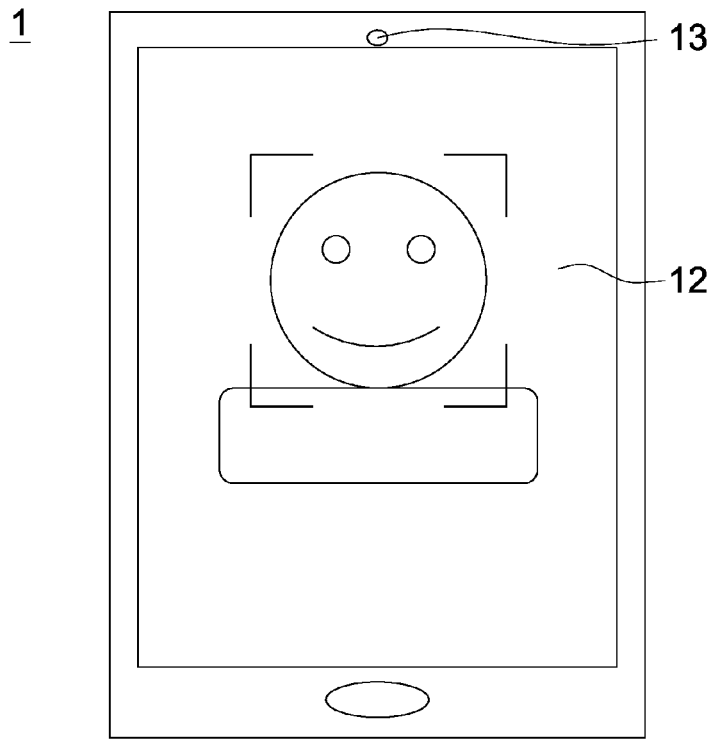
FIG. 5 is a schematic diagram of a portable electronic apparatus detecting a facial expression.
Figure 6:
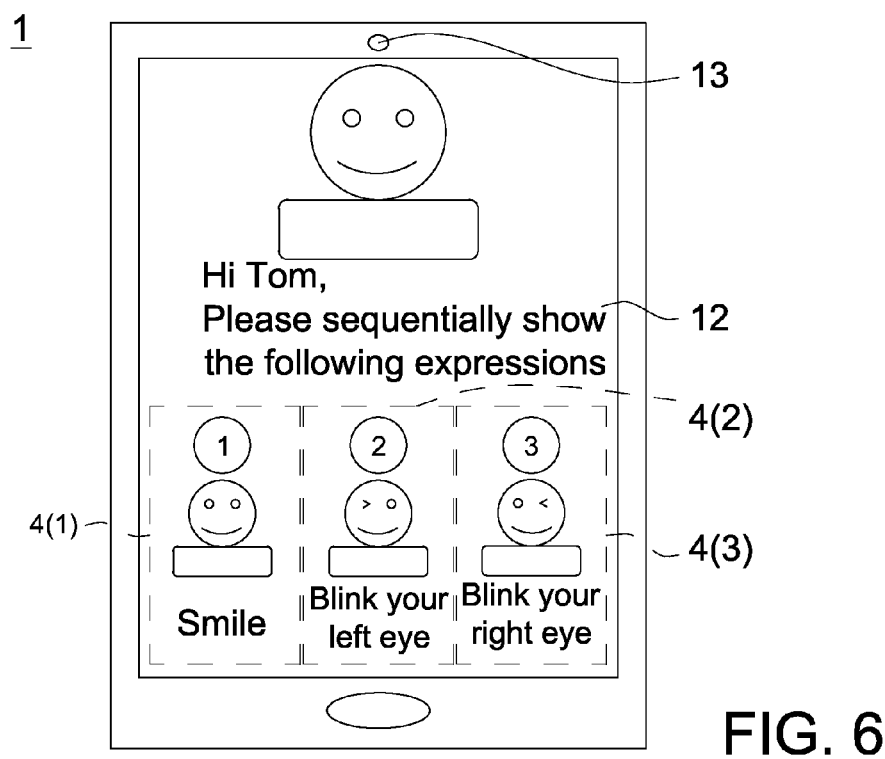
FIG. 6 is a schematic diagram of a portable electronic apparatus after a user's identity is recognized.
Figure 7:
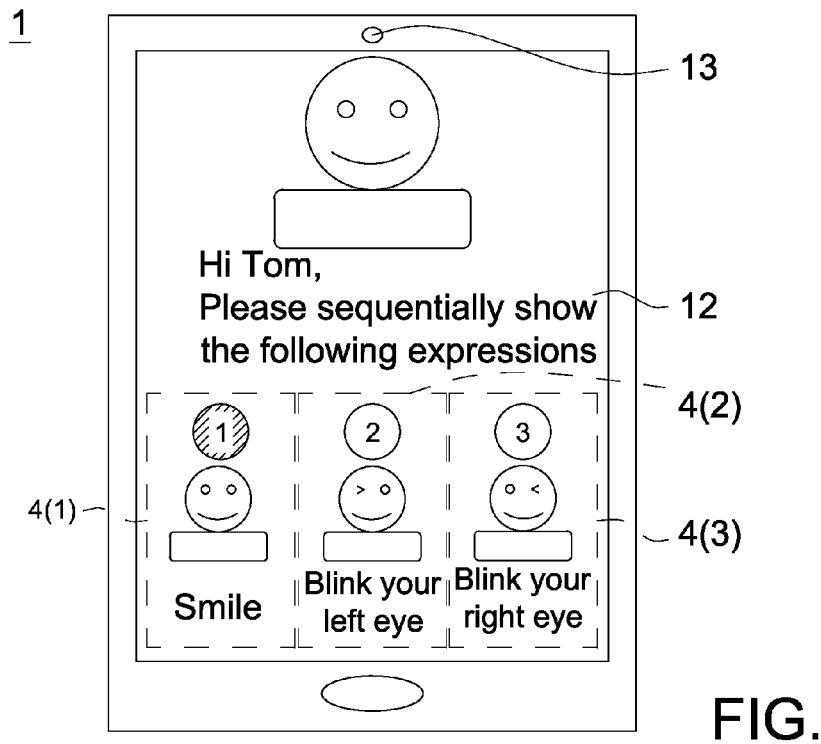
FIG. 7 is a schematic diagram of a portable electronic apparatus requesting a user to shows a facial expression according to a facial expression indication 4(1)
Figure 8:
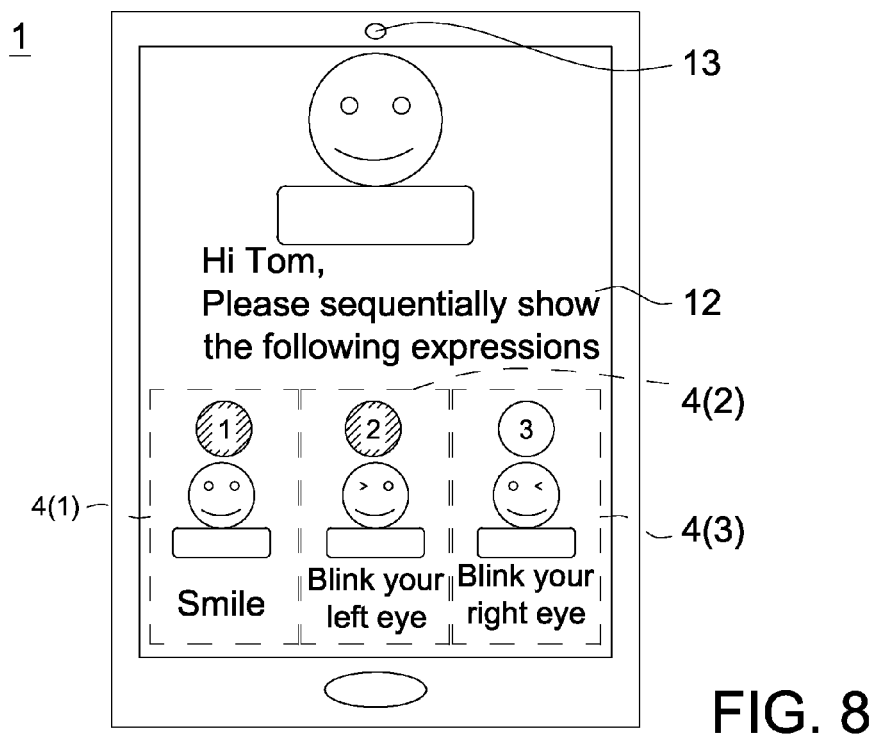
FIG. 8 is a schematic diagram of a portable electronic apparatus requesting a user to shows a facial expression according to a facial expression indication 4(2)
Figure 9:
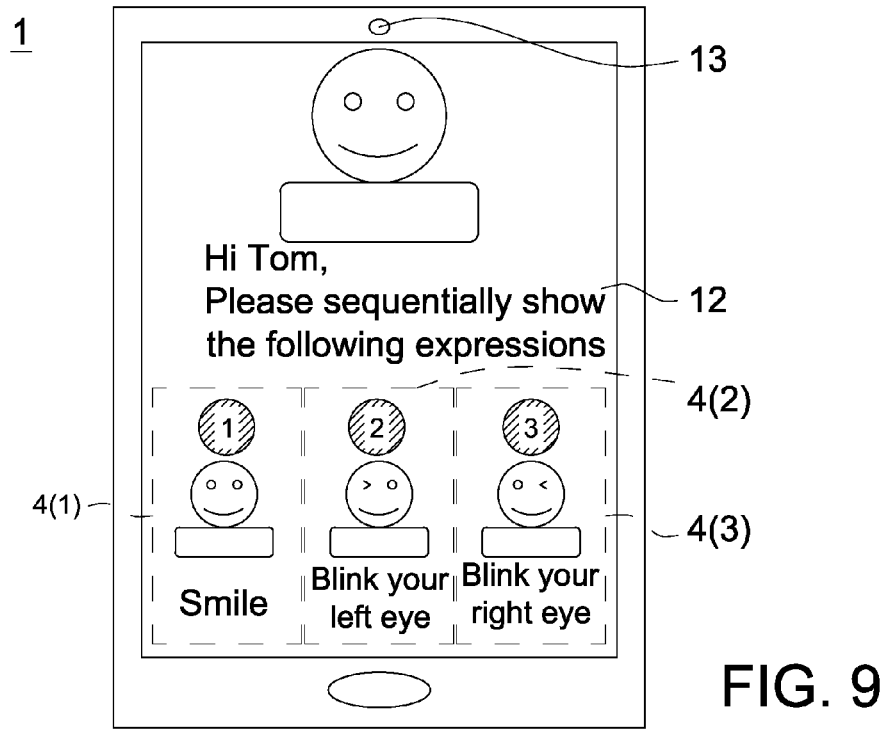
FIG. 9 is a schematic diagram of a portable electronic apparatus requesting a user to shows a facial expression according to a facial expression indication 4(3)
Figure 10:
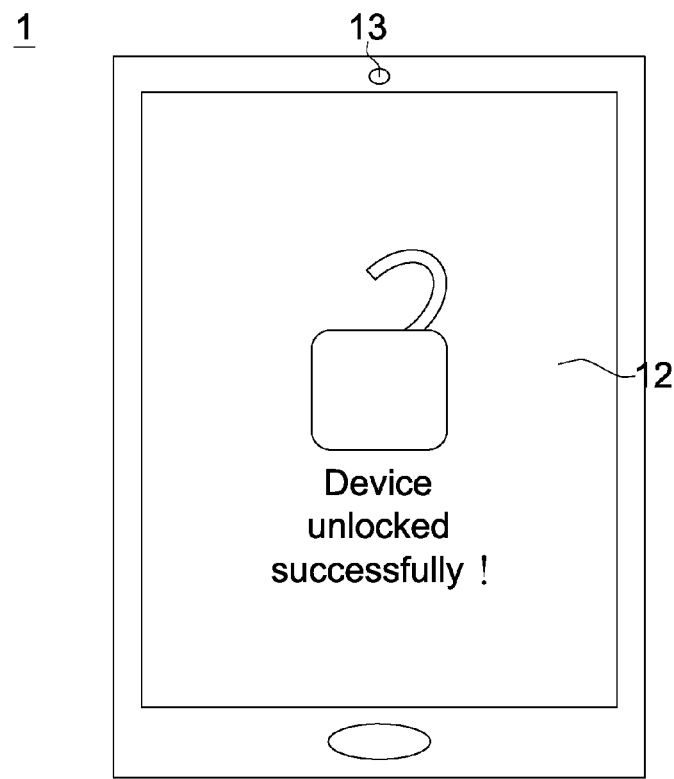
FIG. 10 is a schematic diagram of the portable electronic apparatus allowing a login request.

Referring to FIGS. 4-10. FIG. 4 is a schematic diagram of a portable electronic apparatus being in a locked state. FIG. 5 is a schematic diagram of a portable electronic apparatus detecting a facial expression. FIG. 6 is a schematic diagram of a portable electronic apparatus after a user's identity is recognized. FIG. 7 is a schematic diagram of a portable electronic apparatus requesting a user to shows a facial expression according to a facial expression indication 4(1). FIG. 8 is a schematic diagram of a portable electronic apparatus requesting a user to shows a facial expression according to a facial expression indication 4(2). FIG. 9 is a schematic diagram of a portable electronic apparatus requesting a user to shows a facial expression according to a facial expression indication 4(3). FIG. 10 is a schematic diagram of the portable electronic apparatus allowing a login request.

For instance, before the login request is allowed, the portable electronic apparatus 1 is in a locked state as illustrated in FIG. 4. If the user would like to unlock the portable electronic apparatus 1, the user has to let their face be aligned with the image capturing device 13. After the user's face is aligned with the image capturing device 13, the user interface 12 will show that a facial expression image has been captured by the image capturing device 13. After the portable electronic apparatus 1 recognized the user's identity according to the facial expression image, the display frame of the user interface 12 is as illustrated in FIG. 6. Then, as indicated in FIG. 7, the user interface 12 of the portable electronic apparatus 1 requests the user to show a smiling facial expression according to the facial expression indication 4(1). Then, as indicated in FIG. 8, the user interface 12 requests the user to show a facial expression of blinking the left eye according to the facial expression indication 4(2). Then, as indicated in FIG. 9, the user interface 12 requests the user to show a facial expression of blinking the right eye according to the facial expression indication 4(2). Lastly, as indicated in FIG. 10, if the user according to the facial expression indications 4(1), 4(2) and 4(3) sequentially shows facial expressions of smiling, blinking the right eye and blinking the left eye, then the portable electronic apparatus 1 allows the login request and is unlocked.

Second Embodiment

Figure 11:
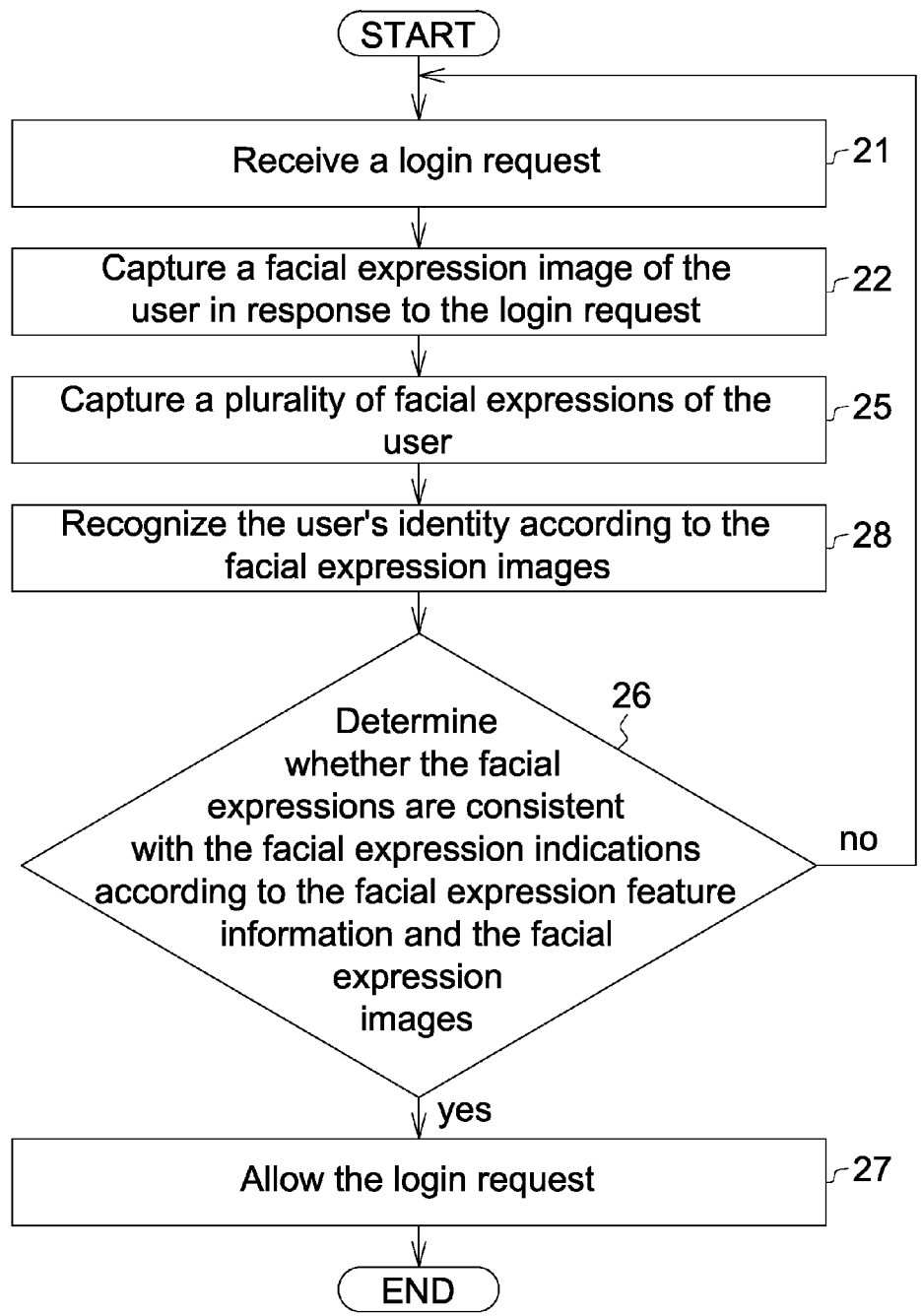
FIG. 11 is a flowchart of an interactive human face login method according to a second embodiment.

Referring to FIG. 1, FIG. 2 and FIG. 11. FIG. 11 is a flowchart of an interactive human face login method according to a second embodiment. The second embodiment is different from the first embodiment mainly in that the interactive human face login method of the second embodiment does not perform step 22 and step 23, but inserts step 28 between step 25 and step 26. Firstly, in step 21, the recognition circuit 14 receives a login request. Then, the method proceeds to step 24, the user interface 12 randomly generates a plurality of facial expression indications 4(1)~4(n) used for guiding a user to sequentially show a plurality of different facial expressions. Then, the method proceeds to step 25, a plurality of facial expressions of the user are captured to output a plurality of facial expression images 5(1)~5(n). Then, the method proceeds to step 28, the recognition circuit 14 recognizes the user's identity according to the facial expression images 5(1)~5(n). Then, the method proceeds to step 26, the recognition circuit 14 determines whether the facial expressions are consistent with the facial expression indications 4(1)~4(n) according to the facial expression feature information 6(1)~6(n) and the facial expression images 5(1)~5(n). If the facial expressions are consistent with the facial expression indications 4(1)~4(n), then the method proceeds to step 27. In step 27, the login request is allowed.

In comparison to the interactive human face login method of the first embodiment, the interactive human face login method of the second embodiment does not need to additionally a plurality of capture facial expression images to recognize the user's identity. The interactive human face login method of the second embodiment can directly recognize the user's identity by using the facial expression images 5(1)~5(n), not only simplifying the procedure but also increasing the processing speed.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A portable electronic apparatus, comprising:
    a face database for storing a plurality of facial expression feature information;
    a user interface for randomly generating a plurality of facial expression indications used for guiding a user to sequentially show a plurality of facial expressions;
    an image capturing device for capturing the plurality of facial expressions to output a plurality of facial expression images; and
    a recognition circuit for receiving a login request and determining whether the plurality of facial expressions are consistent with the facial expression indications according to the plurality of facial expression feature information and the plurality of facial expression images, and the login request is allowed if the facial expressions are consistent with the plurality of facial expression indications.

2. The portable electronic apparatus according to claim 1, wherein the image capturing device captures a facial expression image of the user in response to the login request, and the recognition circuit recognizes the user's identity according to the facial expression image and a facial expression feature information of the face database.

3. The portable electronic apparatus according to claim 1, wherein the recognition circuit recognizes the user's identity according to the plurality of facial expression images.

4. The portable electronic apparatus according to claim 1, wherein the recognition circuit receives a request for adding a new user, the image capturing device captures a facial expression image of the user, and the recognition circuit generates a facial expression feature information according to the facial expression image and generates the plurality of facial expression feature information according to the facial expression feature information and a facial expression modeling technology.

5. The portable electronic apparatus according to claim 1, wherein each facial expression indication comprises a graphic description.

6. The portable electronic apparatus according to claim 1, wherein each facial expression indication comprises a textual description.

7. The portable electronic apparatus according to claim 1, wherein each facial expression indication comprises a graphic description and a textual description.

8. The portable electronic apparatus according to claim 1, wherein the plurality of facial expression indications are different from each other.

9. An interactive human face login method, comprising:
    receiving a login request;
    randomly generating a plurality of facial expression indications used for guiding a user to sequentially show a plurality of facial expressions;
    capturing the plurality of facial expressions to output a plurality of facial expression images;
    determining whether the plurality of facial expressions are consistent with the facial expression indications according to a plurality of facial expression feature information of a face database and the plurality of facial expression images; and
    allowing the login request if the facial expressions are consistent with the plurality of facial expression indications.

10. The interactive human face login method according to claim 9, further comprising:
    capturing a facial expression image of the user in response to the login request; and
    recognizing the user's identity according to the facial expression image and a facial expression feature information of the face database.

11. The interactive human face login method according to claim 9, further comprising:
    recognizing the user's identity according to the plurality of facial expression images.

12. The interactive human face login method according to claim 9, further comprising:
    creating the face database.

13. The interactive human face login method according to claim 9, wherein the creating step comprises:
    receiving a request for adding a new user;
    capturing a facial expression image of the user;
    generating a facial expression feature information according to the facial expression image; and
    generating the plurality of facial expression feature information according to the facial expression feature information and a facial expression modeling technology.

14. The interactive human face login method according to claim 9, wherein each facial expression indication comprises a graphic description.

15. The interactive human face login method according to claim 9, wherein each facial expression indication comprises a textual description.

16. The interactive human face login method according to claim 9, wherein each facial expression indication comprises a graphic description and a textual description.

17. The portable electronic apparatus according to claim 1, wherein the facial expression indications guide the user about how to show the facial expressions.

18. The interactive human face login method according to claim 9, wherein the facial expression indications guide the user about how to show the facial expressions.

* * * * *